United States Patent [19]

Tatevosian et al.

[11] Patent Number: 4,720,025
[45] Date of Patent: Jan. 19, 1988

[54] FEEDER OF LOOSE MATERIALS

[75] Inventors: Ruben A. Tatevosian; Mikhail Y. Titov, both of Moscow, U.S.S.R.

[73] Assignee: Proizvodstvennoe Geologicheskoe Obiedinenie Tsentralnykh Raionov "Tsentrgeologiya", Moscow, U.S.S.R.

[21] Appl. No.: 821,463

[22] Filed: Jan. 22, 1986

[51] Int. Cl.[4] .............................................. G01F 11/14
[52] U.S. Cl. .................................... 222/247; 222/224; 366/273
[58] Field of Search ............... 222/226, 224, 247, 248, 222/243, 200, 246, 199, 244, 226; 366/273, 274

[56] References Cited

U.S. PATENT DOCUMENTS

| | | | |
|---|---|---|---|
| 2,121,486 | 6/1938 | Merchen | 222/247 |
| 2,415,423 | 12/1948 | Bowser | 222/244 |
| 2,611,513 | 9/1952 | Kilpatrick | 222/247 |
| 2,801,773 | 8/1957 | Vitkin | 222/200 |

FOREIGN PATENT DOCUMENTS 1543865 4/1979 United Kingdom .

Primary Examiner—Joseph J. Rolla
Assistant Examiner—Kenneth Noland
Attorney, Agent, or Firm—Fleit, Jacobson, Cohn & Price

[57] ABSTRACT

A feeder of loose materials includes a hopper, a chamber with a control section fashioned as a latticed partition having placed thereon kinematically disconnected magnetic bodies, and a source of alternating magnetic field covering the chamber by magnetic lines of force it generates. The latticed partition has the form of a plurality of parallel vertically arranged plates secured in recesses of the chamber by horizontal pins for the plates to be capable of oscillating relative to these pins. The invention expands the field of application of the feeder, makes the feeder more reliable in operation, and improves the quality of the end product.

14 Claims, 18 Drawing Figures

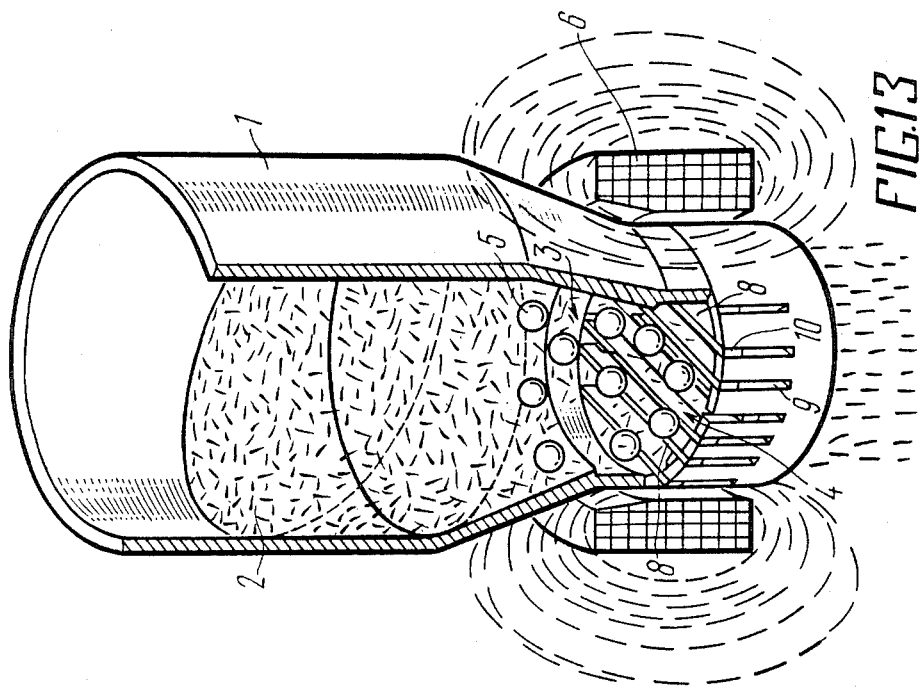
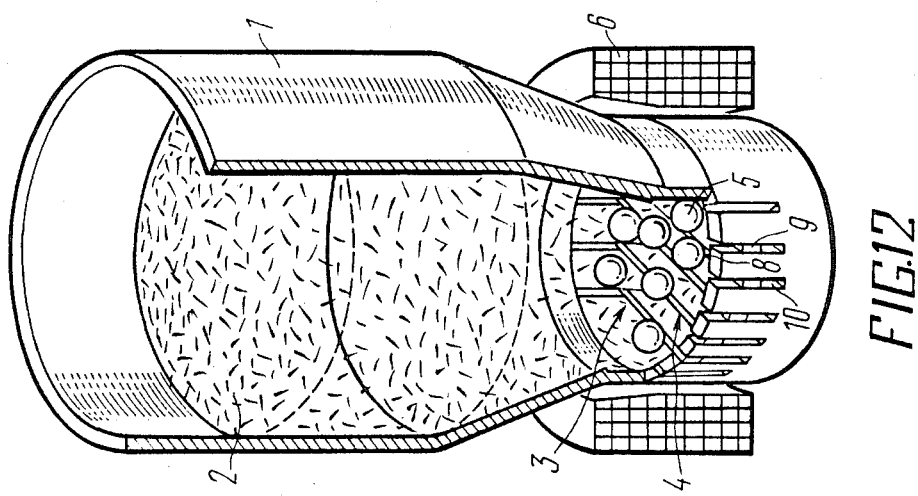

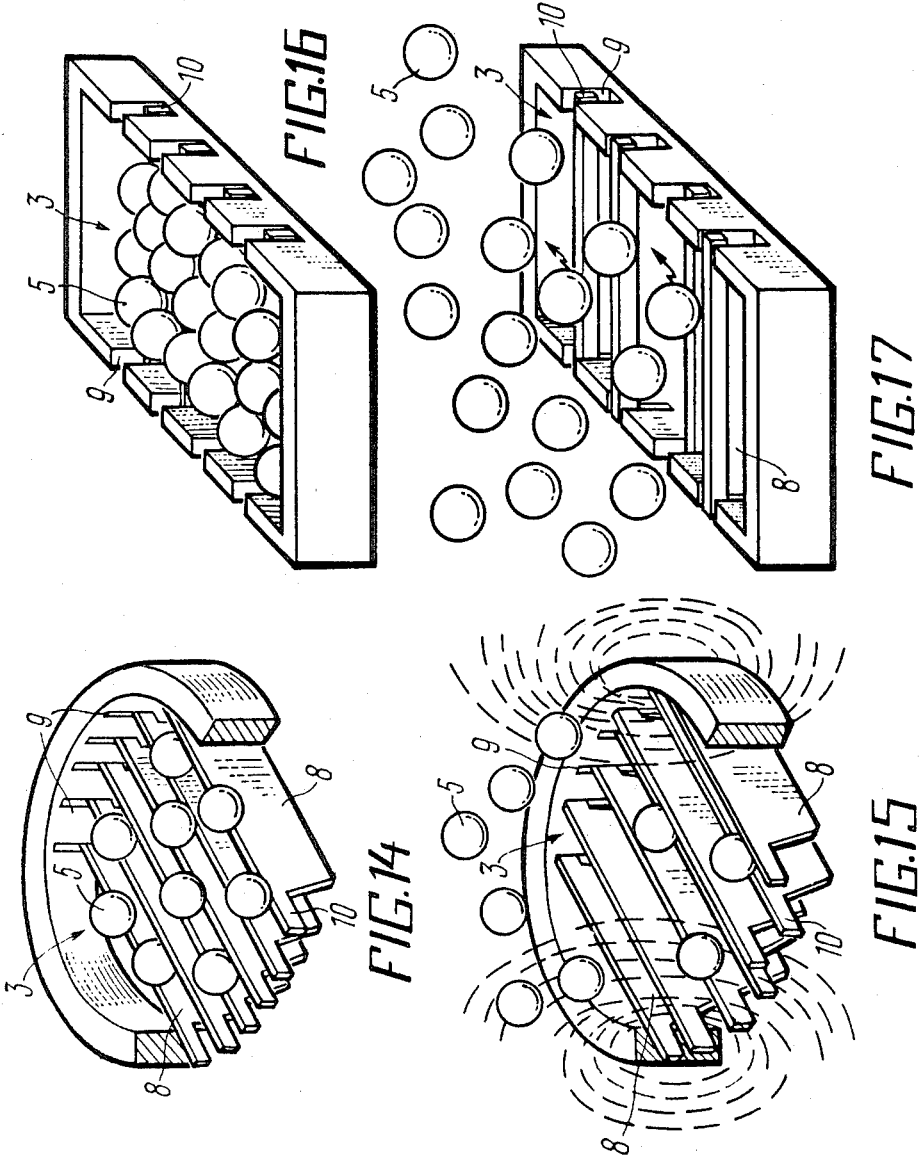

FEEDER OF LOOSE MATERIALS

FIELD OF THE INVENTION

This invention relates to the art of transportation and storage of materials, and more particularly to a feeder of loose materials.

The invention can find a range of industrial applications associated with processing various fine grain, powder, pulverulent and fibrous loose materials in the material transmission lines operated in field conditions.

BACKGROUND OF THE INVENTION

There is known a feeder of loose materials disclosed in U.S. Pat. No. 3,661,302, Cl 222/226 published Sept. 5, 1972, comprising a hopper with a chamber having a discharge hole in which a ferromagnetic body is placed, and a source of alternating magnetic field covering the chamber. The alternating magnetic field makes the ferromagnetic body execute oscillations transmitted to the loose material and causing it to escape from the discharge hole thanks to reduced inner friction between the particles of the loose material. A disadvantage of this feeder resides in that it fails to assure reliable closing of the discharge hole in the absence of the alternating magnetic field, which promotes inadvertent escape of the loose material and confines application of the feeder. In the course of operation the ferromagnetic body fails to disperse the particles of loose material to facilitate breaking of the clogs of such material, which makes this prior art feeder less reliable in operation.

There is also known a feeder of loose materials taught in British Pat. No. 1,543,865, Cl. B 65 G 65/52, published 1979, which comprises a hopper, a chamber arranged in the lower portion of the hopper and having a control means in the form of a latticed partition with kinematically disconnected magnetic bodies placed thereon, and a source of alternating magnetic field covering the chamber by magnetic lines of force it generates. The magnetic bodies act on the loose material to break clots of such material during discharging this material from the hopper, this action making the material being discharged from the hopper more homogeneous to result in improved quality of the end product. However, the latticed partition makes it impossible to use the feeder for discharging bristle-like fibrous and micro-fibrous loose materials, which tend to conjest on the latticed partition to draw the magnetic bodies away therefrom whereby discharge of the loose material is terminated. In addition, such a latteed partition exhibits resistance to the flow of loose material and affects the reliability of the feeder.

SUMMARY OF THE INVENTION

It is an object of the present invention to provide a feeder of loose materials of a wider range of application including its use with fibrous and micro-fibrous loose materials, and increase the reliability of such a feeder in operation.

The object of the invention is attained by that in a feeder of loose materials comprising a hopper, a chamber arranged in the lower portion of the hopper and having a control means in the form of a latticed partition with kinematically disconnected magnetic bodies placed thereon, and a source of alternating magnetic field covering the chamber by magnetic lines of force it generates, according to the invention, the latticed partition has the form of a plurality of paralled vertically arranged plates secured in recesses of the chamber by means of horizontal pins to be capable of oscillating relative to these pins.

Such a construction of the feeder ensures orientation of the fibers of a fibrous loose material along the vertically arranged plates to facilitate their passage through gaps between the plates, reduce resistance of the latticed partition to the flow of loose material, and promote flow stability.

Preferably, for improving reorientation of the fibers of the loose material the vertically arranged plates are fabricated from a ferromagnetic material. Under the action of an alternating magnetic field these plates are caused to oscillate and impart vibration to the particles of fibers of the loose material, increase their fluidity and orientate the fibers along the vertically arranged plates. In addition, oscillation of the plates promotes faster passage of the loose material through gaps formed therebetween.

Advisably, for discharging fibrous loose materials with fiber length exceeding the distance between two adjacent plates these plates are received in recesses to be capable of moving in the vertical plane, the length of each recess being preferably less than the value $H_1$ determined by $$H_1 = \frac{D \cdot 1 \cdot \cos \alpha}{\sin \alpha} + h,$$

where
 D is the miminum diameter of the magnetic body;
 1 is the distance between two adjacent plates;
 $\alpha$ is the maximum allowable deviation angle of the plates during their oscillation relative to the horizontal pins; and
 h is the height of the horizontal pins.

The limitation in the length of the recesses is necessary in order that even at a maximum vertical movement of the plates and their maximum possible deviations during oscillation relative to the horizontal pins the smallest magnetic body would fail to pass through the latticed partition or get jammed between the two adjacent plates.

Favourably, in order to attain a more vigorous action to be exerted on the loose material, the plates are provided with projections above the horizontal pins for these projections to cooperate with the magnetic bodies. Sporadic impacts of the magnetic bodies on the projecting portions of the separate plates cause them to irregularly deviate at a considerable angle and facilitate the discharge of the fibrous loose material.

The invention makes it possible to simplify the discharge of fibrous loose materials, and ensure their pretreatment for obtaining a material better suited for further processing. The proposed feeder can be easily installed in any material transmission lines, including pressure and vacuum lines. It can be linked with automatic adjustment and control systems. If the proposed feeder is suitably connected to a microprocessor and a micromeasuring instrument, the entire system for discharging loose materials can be completely automated. The feeder is noise- and pollution-free, requires small amount of power for operation and safe for the attendants. The feeder can reduce the consumption of loose materials thanks to a more precise material metering and more reliable operation; the other advantage being that pre-orientation of fibers of the fibrous loose material improves the quality of the end product.

BRIEF DESCRIPTION OF THE DRAWINGS

The invention will now be described in greater detail with reference to various specific embodiments thereof taken in conjunction with the accompanying drawings, in which:

FIG. 12 is a general view of the proposed feeder shown in the absence of an alternating magnetic field with the plates capable of movement in the vertical plane;

FIG. 13 is a general view of the feeder with the vertically movable plates during operation;

FIG. 14 is an axonometric partially cut-away view of the round chamber provided with a control means shown in the absence of an alternating magnetic field;

FIG. 15 shows an axonometric partially cut-away view of the round chamber provided with control means during operation of the feeder;

FIG. 16 is an axonometric view of the rectangular chamber provided with a control means in the absence of an alternating magnetic field;

FIG. 17 is an axonometric view of the rectangular chamber provided with a control means during operation of the feeder according to the invention; and FIG. 18 illustrates positions assumed by a magnetic body and two adjacent plates in the feeder according to the invention.

DETAILED DESCRIPTION OF THE INVENTION

Figure 1:
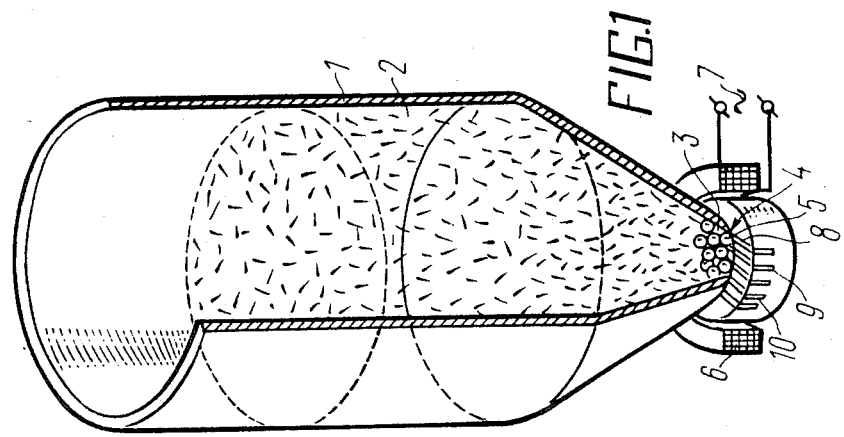
FIG. 1 is a cut-away axonometric view of a feeder of loose materials according to the invention provided with a round chamber.
Figure 1B:
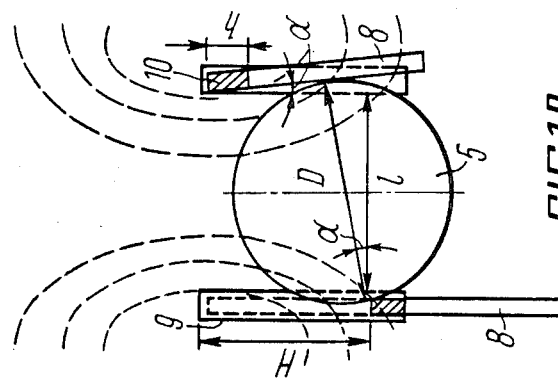

A feeder of loose materials comprises a hopper 1 (FIG. 1) containing a loose material 2 and provided in the bottom portion thereof with a substantially round chamber 3 having a control means in the form of a latticed partition 4 with kinematically disconnected magnetic bodies 5, and a source 6 of alternating magnetic field fed from an alternating current mains 7. The latticed partition 4 is fashioned as a plurality of parallel vertically extending plates 8 secured in recesses 9 of the walls of the chamber 3 by means of horizontal pins 10 to oscillate relative to these pins 10.

Figure 2:
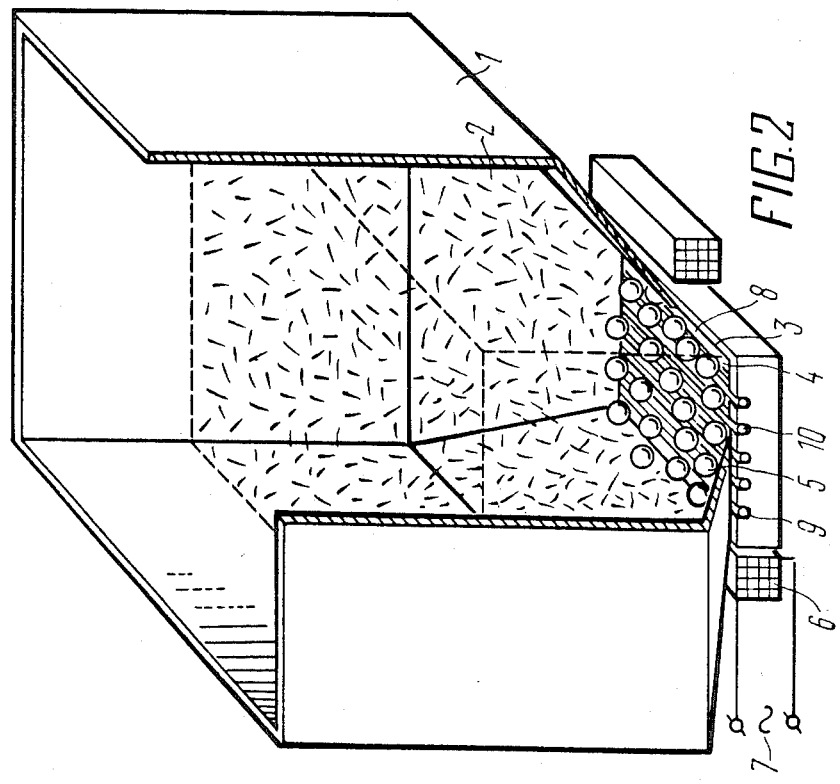
FIG. 2 is an axonometric view of a feeder according to the invention with a rectangular chamber.

FIG. 2 of the drawings represents an alternative embodiment of the proposed feeder provided with rectangular chamber 3 in which all the plates 8 function in equal conditions.

Figure 3:
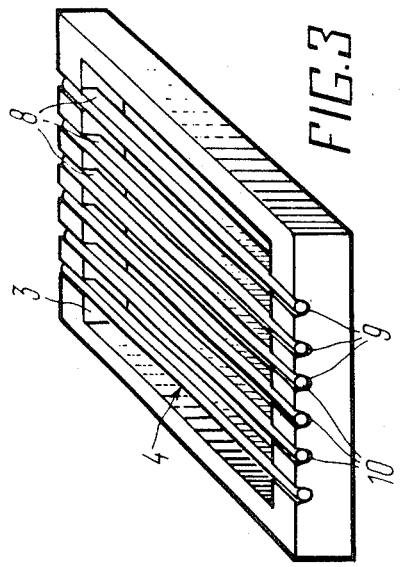
FIG. 3 is an axonometric view of a latticed partition of the feeder having a rectangular chamber.
Figure 4:
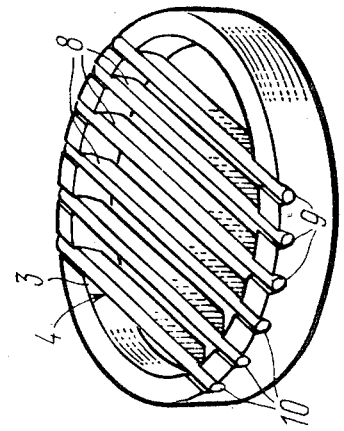
FIG. 4 shows an axonometric view of a latticed partition of the feeder according to the invention having a round chamber.

The mutual positioning of the plates 8 in the recesses 9 of the rectangular chamber 3 is illustrated in FIG. 3, whereas FIG. 4 shows mutual positioning of the plates 8 in the recesses 9 of the round chamber 3.

Figures 5, 6:
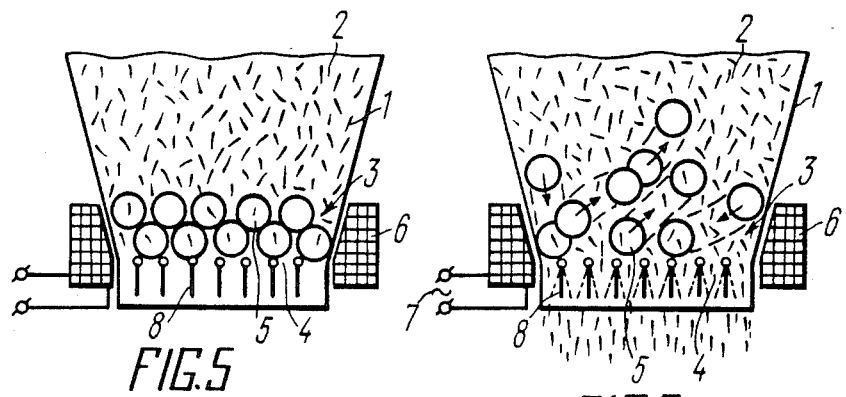
FIG. 5 shows a cross-sectional view of the feeder of loose materials according to the invention when no alternating magnetic field is induced therein.
FIG. 6 is a cross-sectional view of the proposed feeder during operation.

Referring now to FIG. 5, there is shown the arrangement of the hopper 1, chamber 3, latticed partition 4, magnetic bodies 5, alternating magnetic field and plates 8 at the point when no alternating magnetic field is induced; FIG. 6 showing their mutual arrangement when the feeder is in operation. Arrows in FIG. 6 illustrate the travel path of the magnetic bodies 5. Dotted lines illustrate deviations of the plates 8 as they oscillate under the action of the alternating magnetic field.

Figure 7:
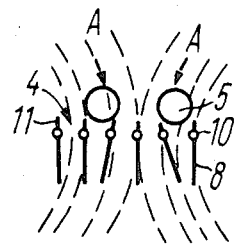
FIG. 7 illustrates part of the latticed partition of the feeder according to the invention.
Figures 8, 9, 10, 11:
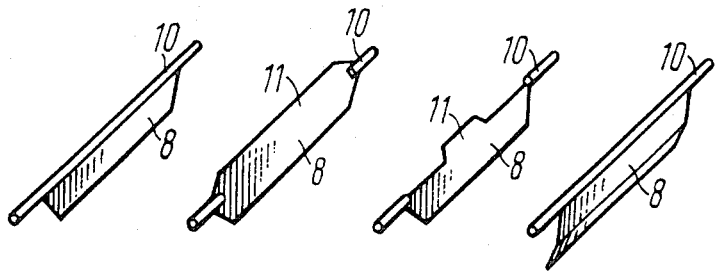
FIG. 8 is one possible embodiment of a plate.
FIG. 9 is a modified form of the plate having a projection extending throught the length of the plate.
FIG. 10 is one more embodiment of the plate having a projecting portion.
FIG. 11 is an alternative form of the plate of the feeder according to the invention.

With reference to FIG. 7, there is shown the manner in which the plates 8 interact with the moving magnetic bodies 5. The arrow A shows the direction of travel of the magnetic bodies 5. The plates 8 (FIG. 8) can have projecting portions 11 (FIG. 7) cooperating with the magnetic bodies 5. The projecting portions 11 (FIG. 9) can extend throughout the length of the plate 8. Alternatively, these projecting portions 11 (FIG. 10) can extend through part of the length of the plates 8. In order to ensure improved cooperation of the plates 8 (FIG. 11) with the flow of loose material 2 (FIG. 6), the plates 8 (FIG. 11) may be bent lengthwise.

Referring to FIG. 12, the plates 8 can be arranged in the recesses 9 so as to be capable of movement in the vertical plane, these plates 8 being preferably fabricated from a ferromagnetic material to facilitate cooperation with the magnetic field. The chamber 3 (FIG. 13) is arranged in the area of action of the magnetic lines of force induced by the source 6 of alternating magnetic field. The magnetic lines of force of the alternating magnetic field are shown by dotted lines in FIGS. 7, 13, 15 and 18. FIGS. 14 and 15 illustrate mutual positioning of the plates 8 and magnetic bodies 5 in the round chamber 3, whereas FIGS. 16 and 17 show the same in the rectangular chamber 3. When the plates 8 (FIG. 18) are arranged to be capable of moving in the vertical plane, the length H of the recess 9 should be less than the value of $H_1$ determined from:

$$H_1 = \frac{D \cdot 1 \cdot \cos \alpha}{\sin \alpha} + h,$$

where

D is the minimum diameter of the magnetic body 5, l is the distance between two adjacent plates 8, α is the maximum allowable deviation angle of the plates 8 when they oscillate relative to the horizontal pins 10, and h is the height of the horizontal pin 10.

When the source 6 (FIG. 5) of alternating magnetic field is cut off the alternating current mains 7 (FIG. 6), the forces of magnetic attraction cause the magnetic bodies 5 to integrate into a cluster which tends to occupy due to the force of gravity the latticed partition 4 (FIG. 12) of the chamber 3 of the proposed feeder of loose materials.

The feeder of loose materials according to the invention operates in the following manner.

A loose material 2 to be discharged is loaded into the hopper 1 (FIG. 1) cut off from the alternating current mains 7. A cluster of the magnetic bodies 5 covers the latticed partition 4 to prevent inadvertent escape of the loose material 2 from the feeder. By connecting the alternating magnetic field source 6 (FIG. 6) to the alternating current mains 7 an alternating electromagnetic field is induced in the chamber 3 of the feeder, this field causing three-dimensional random movement of the magnetic bodies 5. Therewith, the cluster of such bodies is broken into separate bodies 5 which occupy a substantially greater space due to an increase in the distance between such bodies 5. This promotes penetration of the loose material 2 through the bed of moving magnetic bodies 5 to the latticed partition 4 and escape of the loose material 2 from the feeder. The mechanical effect of the mass of moving magnetic bodies 5 on the particles of loose material 2 improves fluidity of this material 2. On the other hand, impacts of the separate magnetic bodies 5 (FIG. 7) on the plates 8 cause the plates 8 to oscillate relative to the horizontal pins 10 thereof, which promotes the passage of the loose material 2 through the latticed partition 4 (FIG. 6). When the alternating electric current supply to the alternating magnetic field source 6 (FIG. 5) is terminated, the electromagnetic field dissappears, the random movement of the magnetic bodies 5 stops, and these bodies are mutually attracted toward one another to integrate into a single cluster, which under the force of gravity falls onto the latticed partition 4 thus stopping the discharge of the loose material 2.

When used with the regular types of loose materials, the proposed feeder is highly reliable in operation due to that resistance to the flow of loose material 2 is greatly reduced by the latticed partition 4. When feeding fibrous loose materials 2 having particles of anisometric shape, some of such particles tend to get stuck on the latticed partition 4 and assume a position across the plates 8. Therefore, these particles may congest and close the discharge of the loose material from the hopper. However, the latticed partition 4 is so constructed as to prevent the formation of a layer of fibrous loose material 2 thereon. The parallel plates 8 capable of independent oscillations relative to their horizontal pins 10 under the action of the alternating magnetic field or due to the mechanical effect of the magnetic bodies 5 causes reorientation of the jammed fibrous particles to result in their discharge through free spaces between the adjacent plates 8.

If fabricated from a ferromagnetic material, the plates 8 (FIG. 6) respond to an alternating magnetic field induced by the source 6 of alternating magnetic field. Throughout the operation of the alternating magnetic field source 6 of the plates 8 oscillate relative to their horizontal pins 10. Sporadic impacts delivered by the magnetic bodies 5 on the projecting portions 11 (FIG. 7) of the plates 8 affect the synchronism and rhythm of oscillations to result in independent spontaneous movement of the plates 8, which favours reorientation of the fibrous particles of the loose material 2 (FIG. 6).

With reference to the modification of the proposed feeder of loose materials represented in FIG. 12, in which the plates 8 are capable of moving in the vertical plane, in the absence of an alternating magnetic field the horizontal pins 10 tend to assume a stationary position close to the lower end of the recess 9 under the action gravity of these plates 8, weight of the magnetic bodies 5, and weight of the loose material 2.

When the feeder is energized by being connected to the alternating current mains 7 (FIG. 13), then under the action of the alternating magnetic field the plates 8 are drawn into the chamber 3 so that their horizontal pins 10 rest in the recesses 9 on a magnetic cushion without mechanical support. Such position of the plates 8 makes them very responsive to the effect of the alternating magnetic field, which is accounted for by the absence of friction between the horizontal pins 10 and the lower end of the recess 9, and especially responsive to mechanical impacts delivered by the magnetic body 5 (FIGS. 15, 17) on the plate 8. Such impacts cause the plate 8 to suddenly move downwards, whereby the distance between this plate 8 and adjacent plates 8 increases to facilitate reorientation of the jammed fibers and promote the escape of the loose material 2 (FIG. 13) from the feeder. The fibrous loose material 2 which has passed through the feeder is orientated so that the fibers escape in parallel to one another, which is important for making structural materials.

In view of the aforedescribed, the present invention makes it possible to use the proposed feeder of loose materials with fibrous, microfibrous and bristle-like materials, as well as to ensure a more reliable operation of the feeder. The invention also enables to reduce the amount of loose material used for and improve the quality of the end product. The structural simplicity of the feeder ensures long service life and amenability to employment with automatically controlled systems.

What is claimed is:

1. A feeder of loose material comprising:
   a hopper;
   a chamber arranged in a lower portion of said hopper;
   recesses provided on opposite sides of said chamber;
   control means of said chamber to permit the discharge of the loose materials thought the hopper;
   a latticed partition which comprises said control means;
   kinematically disconnected magnetic bodies arranged on said latticed partition;
   said latticed partition including horizontal pins provided on respective ends of parallel vertically arranged plates secured in said recesses of said chamber by means of said horizontal pins for oscillating said plates relative to said chamber; and
   a source of alternating magnetic field covering said chamber with magnetic lines of force for oscillating said plates relative to said recesses and for moving said magnetic bodies to contact said plates causing said plates to oscillate.

2. A feeder of loose materials as defined in claim 1, in which said plates are fabricated from a ferromagnetic material.

3. A feeder of loose materials as defined in claim 2, in which
   the length of each said recess of said chamber is less than the sum of the height of each of said horizontal pin and the ratio of the minimum diameter of said magnetic bodies and the distance between two said adjacent plates multiplied by the cosine of the maximum allowable deviation angle of said plates during their oscillations relative to said horizontal pins to the sine of the maximum allowable deviation angle of said plates relative to said horizontal pins during their oscillation;
   said plates are received by said recesses to be capable of moving in the vertical plane.

4. A feeder of loose materials as defined in claim 3, in which said plates have projecting portions above said horizontal pins to cooperate with said magnetic bodies.

5. A feeder of loose materials as defined in claim 2, in which said plates have projecting portions above said horizontal pins to cooperate with said magnetic bodies.

6. A feeder of loose materials as defined in claim 1, in which said plates have portions projecting upwards from said horizontal pins to cooperate with said magnetic bodies.

7. A feeder of loose materials comprising:
a hopper for containing the loose materials,
a chamber located at a lower portion of said hopper,
recesses provided on opposite sides of said chamber,
parallel vertically arranged plates terminating in pins at opposite ends thereof, said pins being movably mounted in said recesses to locate said plates across said chamber,
kinematically disconnected magnetic bodies arranged on said plates, and
alternating magnetic field means covering said chamber with magnetic lines of force for oscillating said plates relative to said recesses and for moving said magnetic bodies to contact said plates to oscillate said plates.

8. A feeder of loose materials as claimed in claim 7, wherein said plates include portions projecting above said horizontal pins to cooperate with said magnetic bodies.

9. A loose material feeder, comprising:
a hopper;
a chamber arranged in the lower portion of said hopper;
recesses provided on opposite sides of said chamber;
control means of said chamber to permit the discharge of the loose materials through the hopper;
a source of alternating magnetic field covering said chamber with its magnetic lines of force;
a latticed partition which comprises said control means;
kinematically disconnected magnetic bodies disposed on said latticed partition;
said latticed partition including horizontal pins provided on respective ends of a plurality of parallel vertical extending plates secured in said recesses of said chamber by means of said longitudinal horizontal pins to be able to oscillate relative to said pins under the mechanical force of said magnetic bodies when the source of alternating magnetic field is actived.

10. A loose material feeder as claimed in claim 9, wherein said plates are made of a ferromagnetic material being capable of oscillating relative to said horizontal pins under the effect of said magnetic lines of force of said source of alternating magnetic field.

11. A loose material feeder as claimed in claim 10, wherein the length of each said recess of said chamber is smaller than the total height of said horizontal pins plus the quotient of the minimum diameter of said magnetic bodies multiplied by the distance between two said adjacent plates multiplied by the cosine of the maximum permissible deviation angle of said plates oscillating relative to said horizontal pins divided by the sine of the maximum permissible deviation angle of said plates oscillating relative to said horizontal pins; and
said plates being received in said recesses and capable of moving in the vertical plane under the effect of said magnetic lines of force of said source of alternating magnetic fields and under the mechanical force of said magnetic bodies.

12. A loose material feeder as claimed in claim 11, wherein said plates have portions projecting upward from the horizontal pins to cooperate magnetically and mechanically with said magnetic bodies.

13. A loose material feeder as claimed in claim 10, wherein said plates have portions projecting upward from said horizontal pins to cooperate magnetically and mechanically with said magnetic bodies.

14. A loose material feeder as claimed in claim 9, wherein said plates have portions projecting upward from said horizontal pins to cooperate with said magnetic bodies.

* * * * *